United States Patent
Abe et al.

(10) Patent No.: US 9,026,830 B2
(45) Date of Patent: May 5, 2015

(54) INFORMATION PROCESSING APPARATUS

(75) Inventors: Keiko Abe, Yokohama (JP); Shinobu Fujita, Inagi (JE)

(73) Assignee: Kabushiki Kaisha Toshiba, Tokyo (JP)

( * ) Notice: Subject to any disclaimer, the term of this patent is extended or adjusted under 35 U.S.C. 154(b) by 513 days.

(21) Appl. No.: 13/421,090

(22) Filed: Mar. 15, 2012

(65) Prior Publication Data
US 2013/0031397 A1 Jan. 31, 2013

(30) Foreign Application Priority Data
Jul. 28, 2011 (JP) ................................. 2011-166072

(51) Int. Cl.
G06F 1/00 (2006.01)
G06F 1/32 (2006.01)

(52) U.S. Cl.
CPC ............ *G06F 1/3275* (2013.01); *G06F 1/3225* (2013.01); *Y02B 60/1225* (2013.01)

(58) Field of Classification Search
USPC .................. 713/200, 310, 320, 322, 323, 324
See application file for complete search history.

(56) References Cited

U.S. PATENT DOCUMENTS

| | | | | |
|---|---|---|---|---|
| 6,523,125 | B1 * | 2/2003 | Kohno et al. | 713/320 |
| 8,020,014 | B2 * | 9/2011 | Priel et al. | 713/320 |
| 8,266,459 | B2 * | 9/2012 | Dathe et al. | 713/300 |
| 2003/0145239 | A1 * | 7/2003 | Kever et al. | 713/300 |
| 2004/0004876 | A1 * | 1/2004 | Choi et al. | 365/202 |
| 2005/0232052 | A1 * | 10/2005 | Jin | 365/226 |
| 2006/0206737 | A1 * | 9/2006 | Lee | 713/320 |
| 2007/0226403 | A1 * | 9/2007 | Son et al. | 711/103 |
| 2009/0300375 | A1 * | 12/2009 | Zou et al. | 713/300 |
| 2010/0115297 | A1 * | 5/2010 | Dathe et al. | 713/300 |
| 2010/0138681 | A1 * | 6/2010 | Kato | 713/324 |
| 2011/0093727 | A1 * | 4/2011 | Hwang | 713/320 |
| 2011/0283124 | A1 * | 11/2011 | Branover et al. | 713/323 |
| 2012/0173907 | A1 * | 7/2012 | Moses et al. | 713/321 |
| 2013/0227321 | A1 * | 8/2013 | Branover et al. | 713/322 |
| 2013/0232365 | A1 * | 9/2013 | Nishijima | 713/324 |

FOREIGN PATENT DOCUMENTS

JP 2009-211153 9/2009

OTHER PUBLICATIONS

Notification of Reasons for Refusal issued by the Japanese Patent Office on Aug. 8, 2014, for Japanese Patent Application No. 2011-166072, and English-language translation thereof.

\* cited by examiner

*Primary Examiner* — Zahid Choudhury
(74) *Attorney, Agent, or Firm* — Finnegan, Henderson, Farabow, Garrett & Dunner, L.L.P.

(57) ABSTRACT

One embodiment provides an information processing apparatus including a processor; memory blocks; an internal voltage generator connected to the memory blocks; an input/output circuit connected to the memory blocks; switches each installed corresponding to the internal voltage generator, the input/output circuit, and the memory blocks, and configured to switch ON/OFF of the connection with a power source; a data register configured to store a data set that controls the ON/OFF of the switches; and a data management circuit configured to set the data set in the data register, wherein when a clock signal input to the processor is turned to OFF, the data management circuit generates a first type of the data set, which switches ON the switch connected to the internal voltage generator and switches OFF the switches connected to the memory blocks, and sets the first type of the data set in the data register.

16 Claims, 18 Drawing Sheets

INFORMATION PROCESSING APPARATUS

CROSS REFERENCE TO RELATED APPLICATION(S)

This application is based upon and claims the benefit of priority from Japanese Patent Application No. 2011-166072, filed on Jul. 28, 2011; the entire contents of (all of) which are incorporated herein by reference.

FIELD

Embodiments described herein relate generally to an information processing apparatus.

BACKGROUND

An information processing system generally includes a processor core, a cache memory, and a main memory. The cache memory is configured by a Static Random Access Memory (SRAM), and the main memory is configured by a Dynamic Random Access Memory (DRAM). Both of the SRAM and the DRAM are volatile memories that require a power in order for data retention. The SRAM has a large leakage current in a data cell, and the DRAM requires a rewrite (refresh) operation for data retention. Therefore, both of the SRAM and the DRAM have a problem that power consumption is high.

Accordingly, a method for reducing power consumption has been adopted with respect to an information processing system having a state in which the information processing system executes an operation (hereinafter, referred to as an operation mode) and a state in which the information processing system does not execute an operation (hereinafter, referred to as a standby mode). Specifically, when the information processing system is in the standby mode, since there is no access from the processor core to the cache memory, a power voltage of the SRAM constituting the cache memory is dropped down to a minimum voltage at which data is retainable, or data within the SRAM is stored in the main memory and then power of the SRAM is shut down, thereby reducing power consumption.

As a method reducing power consumption of the information processing system, a method focused on the memories in the processing system consist of nonvolatile memories has been suggested. The system will be less setup time because it does not need to reload data after a standby mode. The longer time in a standby mode will result in reducing power consumption. As a method for further reducing power consumption, the partitioned nonvolatile memory in the processing system has been suggested. For example, in an information processing apparatus including a nonvolatile memory with a plurality of memory arrays, the power supply is controlled at every memory array, such that when the processor accesses specific memory arrays, ON/OFF operations of the power supply for the specific memory arrays, which are to be accessed, are controlled while the power supply for other memory arrays are shut down. In this manner, the low power consumption is realized.

BRIEF DESCRIPTION OF THE DRAWINGS

A general architecture that implements the various features of the present invention will now be described with reference to the drawings. The drawings and the associated descriptions are provided to illustrate embodiments and not to limit the scope of the present invention.

DETAILED DESCRIPTION OF THE EXEMPLARY EMBODIMENTS

In general, one embodiment provides an information processing apparatus including a processor configured to be operated according to a clock signal; a plurality of memory blocks including at least a nonvolatile memory; an internal voltage generation circuit connected to the plurality of memory blocks; an input/output circuit connected to the plurality of memory blocks; a plurality of switches each installed corresponding to the internal voltage generation circuit, the input/output circuit, and the plurality of memory blocks, and configured to switch ON/OFF of the connection with a power source; a power control data register configured to store a data set that controls the ON/OFF of the switches; and a power control data management circuit configured to set the data set in the power control data register, wherein when a clock signal input to the processor is turned to OFF, the power control data management circuit generates a first type of the data set, which switches ON the switch connected to the internal voltage generation circuit and switches OFF the switches connected to the plurality of memory blocks, and sets the first type of the data set in the power control data register.

Embodiments will be described below.

(First Exemplary Embodiment)

Figure 1:
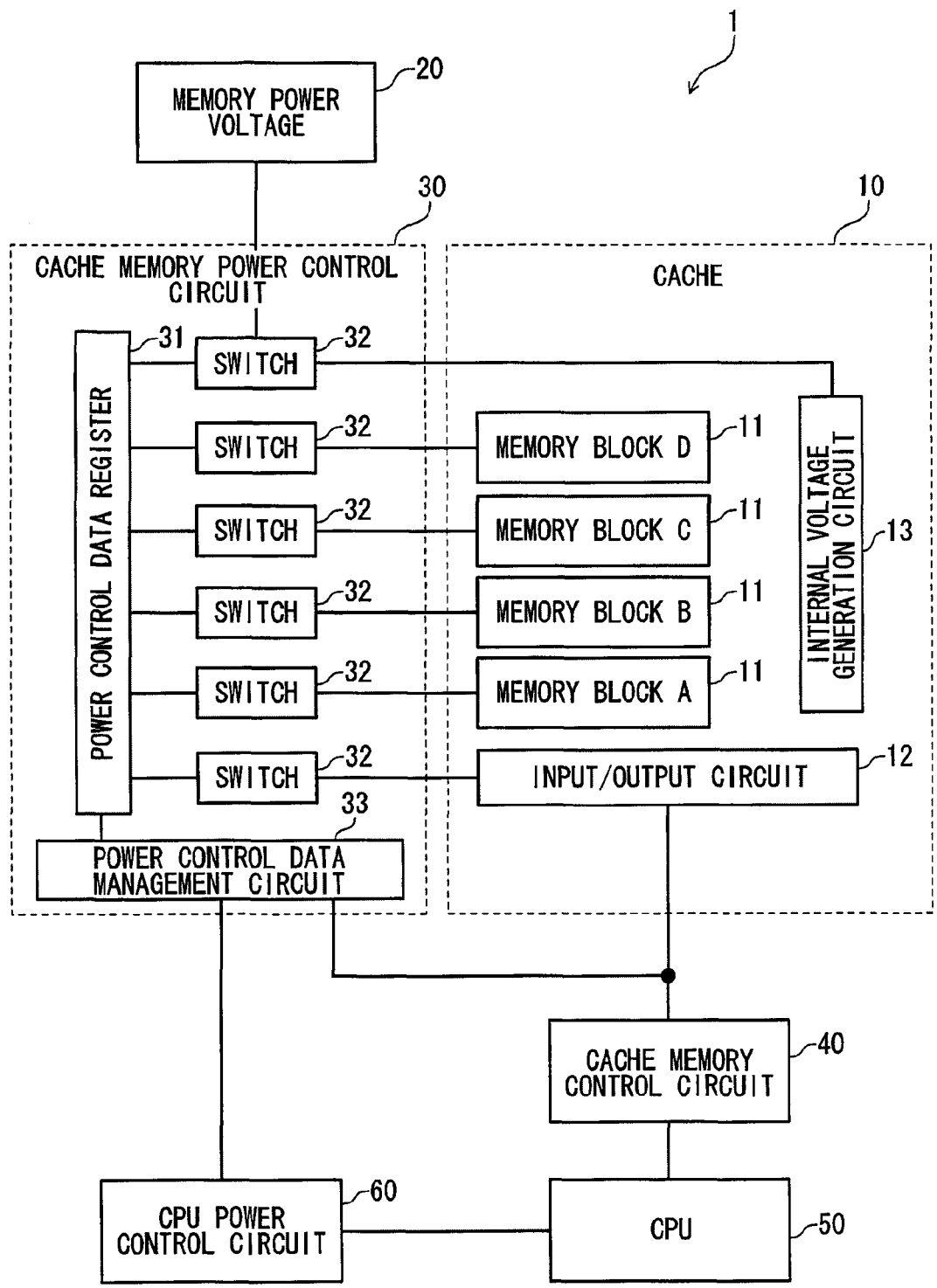
FIG. 1 is a block diagram of an information processing apparatus according to a first exemplary embodiment of the present invention.

Hereinafter, exemplary embodiments of the present invention will be described with reference to the drawings. FIG. 1 is a block diagram of an information processing apparatus according to the present exemplary embodiment. The information processing apparatus according to the present exemplary embodiment is, for example, a processor of information equipment, such as a PC, a portable phone, or the like.

The information processing apparatus 1 includes a cache 10, a memory power voltage 20, a cache memory power control circuit 30, a cache memory control circuit 40, a CPU 50, and a CPU power control circuit 60. Herein, the cache 10 is configured by a nonvolatile memory. Any types of nonvolatile memories may be used as long as they have nonvolatile properties. For example, a Magnetoresistive Random Access Memory (MRAM), a Phase change RAM (PRAM), a Resistance Random Access Memory (ReRAM), a Ferroelectric Random Access Memory (FeRAM), a RAM using ion conductivity, or the like, may be used.

The memory power voltage 20 supplies power to the cache 10. The CPU 50 executes an operation using data stored in the cache 10, based on a CPU core clock signal. The CPU core power control circuit 60 determines a state of the CPU 50 and inputs to the CPU 50 a state information signal for performing a control (sleep control, wake-up control, and so on) according to the determined state of the CPU 50. The cache memory control circuit 40 controls an access (data reading/writing) to the cache 10 according to the operation of the CPU 50. The cache memory power control circuit 30 determines a memory block of the cache 10, which is to be accessed by the cache memory control circuit 40, and controls the power supply at every memory block of the cache according to the control of the cache memory control circuit 40. The detailed operation of the cache memory power control circuit 30 will be described below.

The cache 10 includes a plurality of memory blocks 11, an input/output circuit 12, and an internal voltage generation circuit 13. In FIG. 1, a case where four memory blocks are provided will be taken as an example, and the respective memory blocks are represented by a memory block A to a memory block D. The respective memory blocks 11 may correspond to one or a plurality of memory arrays, or may correspond to memory areas defined by further subdividing the memory array. The input/output circuit 12 reads data from designated addresses of the memory blocks 11 or writes data to the memory blocks 11 according to the control of the cache memory control circuit 40.

The memory blocks 11 are connected to the corresponding internal voltage generation circuit 13. The internal voltage generation circuit 13 includes a pump circuit (not shown) and supplies the memory blocks 11 with a program voltage serving as a high voltage at writing, a read voltage, or the like according to the control of the cache memory control circuit 40.

The respective elements of the cache 10 and the memory power voltage 20 are connected through switches 32 of the cache memory power control circuit 30. For example, as illustrated in FIG. 2, the respective switches 32 switch ON/OFF of the connection between the memory power voltage 20 and the respective elements of the cache 10 (the memory block 11, the input/output circuit 12, and the internal voltage generation circuit 13), based on data stored in a power control data register 31.

The power control data register 31 acquires, from the power control data management circuit 33, data for controlling the respective switches 32 that switches ON/OFF of the power supply to the memory blocks 11, the input/output circuit 12, and the voltage generation circuit 13 of the cache 10, and stores the acquired data.

Figure 2:
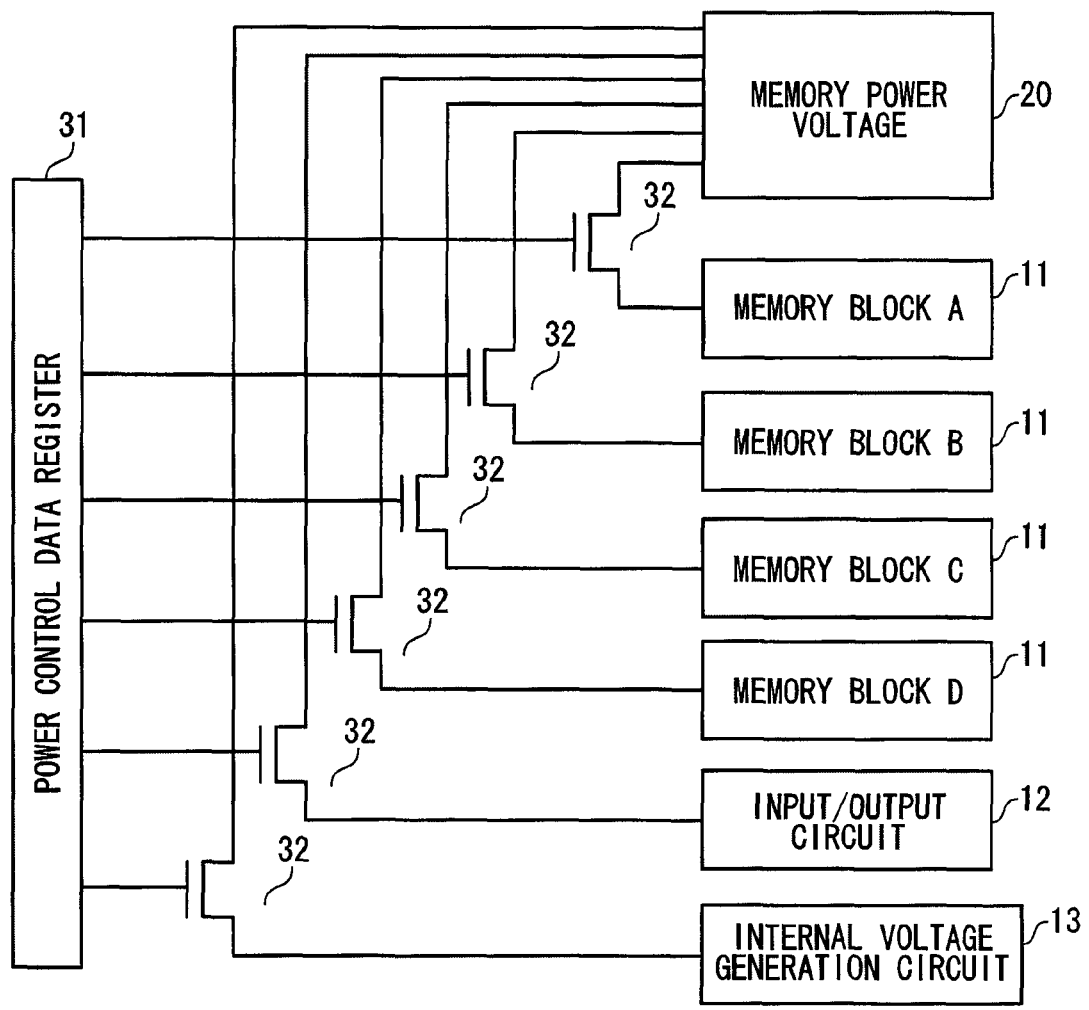
FIG. 2 is a view of switches that are included in a cache of the information processing apparatus according to the first exemplary embodiment of the present invention.

As illustrated in FIG. 2, the connections between the respective memory blocks A to D of the memory blocks 11 and the memory power voltage 20 are controlled by different switches 32. Therefore, whether to supply or shut down power may be controlled at each of the memory blocks 11.

The connection between the input/output circuit 12 and the memory power voltage 20 or the connection between the internal voltage generation circuit 13 and the memory power voltage 20 is controlled using switches different from the switches that control the power supply of the memory blocks 11. Accordingly, the power supply to the input/output circuit 12 and the internal voltage generation circuit 13 may be controlled independently of the memory blocks 11.

Figure 3:
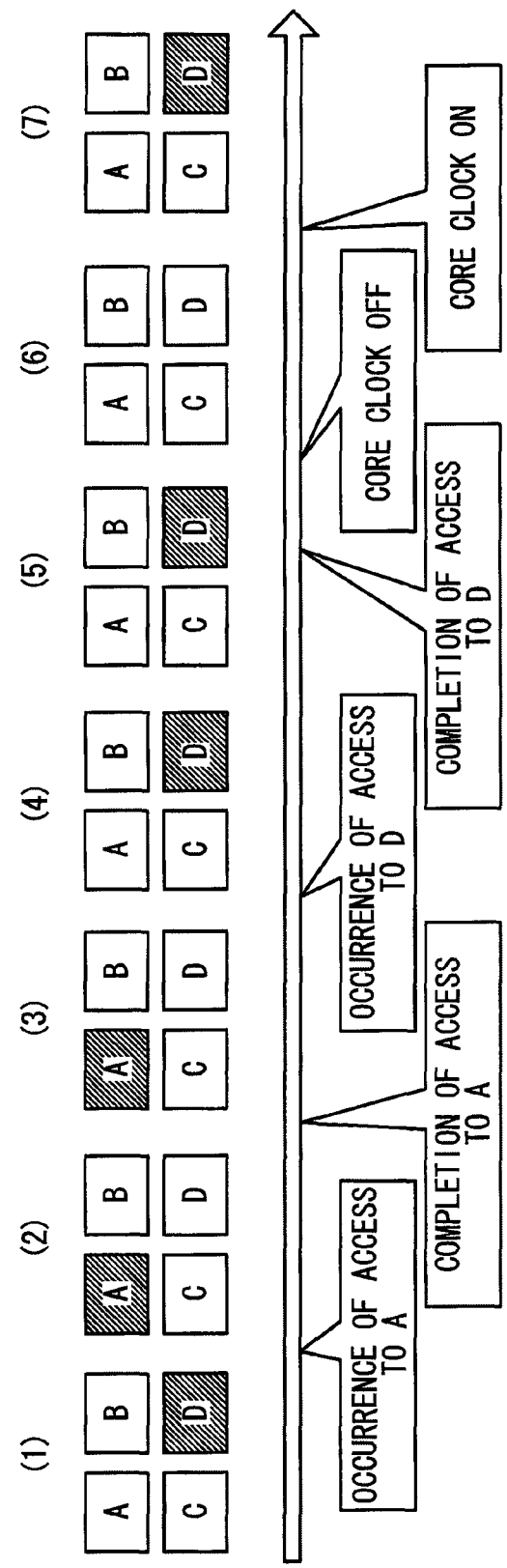
FIG. 3 is a view illustrating a supply control of the power of the information processing apparatus according to the first exemplary embodiment of the present invention.

FIG. 3 is a view illustrating a power supply control of the memory blocks 11 by the information processing apparatus 1. When the cache memory power control circuit 30 determines which one of the memory blocks A to D is accessed, the information processing apparatus 1 according to the present exemplary embodiment starts to supply the power to the accessed memory block and maintains the power supply to the accessed memory block until an access to a next memory block occurs.

For example, in FIG. 3, when an access to the memory block A occurs, power is supplied to the memory block A, as in the state (2). Meanwhile, in FIG. 3, the memory blocks supplied with power are represented by hatching. Even after the access to the memory block A is completed, the power supply to the memory block A is continued, as in the state (3). Thereafter, when an access to the memory block D occurs, the power supply to the memory block A is stopped and the power supply to the memory block D is started, as in the state (4).

In the information processing apparatus 1 according to the present exemplary embodiment, in a case where the CPU power control circuit 60 determines whether the processing of the CPU 50 is completed, and outputs a signal (state signal) for switching OFF the CPU core clock signal, the state signal is also input to the cache memory power control circuit 30. The cache memory power control circuit 30 controls data of the power control data register 31 such that the power supply to the entire memory blocks 11 is stopped.

For example, as in the state (5) of FIG. 3, the power supply to the memory block D is continued until a predetermined time elapses after the completion of the access to the memory block D. Thereafter, when the CPU power control circuit 60 determines that the predetermined time elapses after the access to the memory block D is completed, the CPU power control circuit 60 switches OFF the CPU core clock signal by outputting the state signal to the CPU 50. Accordingly, the CPU 50 enters a standby mode and, simultaneously, the power supply to the entire memory blocks 11 is stopped, as in the state (6). When the CPU core clock signal to be inputted to the CPU 50 becomes an active state and the CPU 50 becomes an operation mode, the power supply to the memory block D accessed at the previous time is started, as in the state (7).

After the power supply to the memory block accessed at the previous time is started based on the state in which the CPU 50 becomes the operation mode, the power control data management circuit 33 determines which memory block has the address to be accessed instructed from the CPU 50, and starts the power supply to the memory block to which the address to be accessed belongs. At this time, if the memory block, to which the power supply is started based on the state in which the CPU 50 becomes the operation mode, is identical to the memory block determined by the power control data management circuit 33, the power control data management circuit 33, after determining the memory block, may not perform a process of starting the power supply to the corresponding memory block. Therefore, there is a probability that can shorten a processing time until accessing the memory block after the CPU 50 becomes the operation mode.

The information processing apparatus 1 including a non-volatile memory may realize ultra low-power-consumption information processing by shutting down power for the memory blocks even through time during which the operation processing is not performed, is a short time of 1 msec or less. Therefore, even when a user continuously uses one application, it is determined that the operation processing is not performed. Therefore, it is estimated that a state where the CPU 50 changes to the standby mode (which shuts down the power to the entire memory blocks) and a state where the CPU 50 returns to the operation mode (which supplies power to any one memory block), are repeated. As such, in a situation in which the same application is used before and after shutting down power for the entire memory blocks, it is though that there are many cases in which the memory blocks required to be accessed from the CPU 50 do not change. Therefore, in a case where the CPU 50 changes to the standby mode and then returns to the operation mode, it is effective that the power supply to the memory block accessed lastly is started.

If the memory block accessed lastly, to which the power supply is started when the CPU 50 returns to the operation mode, is different from the memory block including the address intended to be accessed from the CPU 50, which is determined by the power control data management circuit 33, the power supply to the memory block determined by the power control data management circuit 33 is started. Even in this case, the access to the memory block may be started at the equal time to a case where the present exemplary embodiment is not applied (a case where the power is not supplied to the memory block accessed lastly when the CPU 50 returns to the operation mode).

Next, with reference to FIGS. 4 and 5, the processing of the information processing apparatus 1 for controlling power supply to the memory block as illustrated in FIG. 3 will be described.

Figure 4:
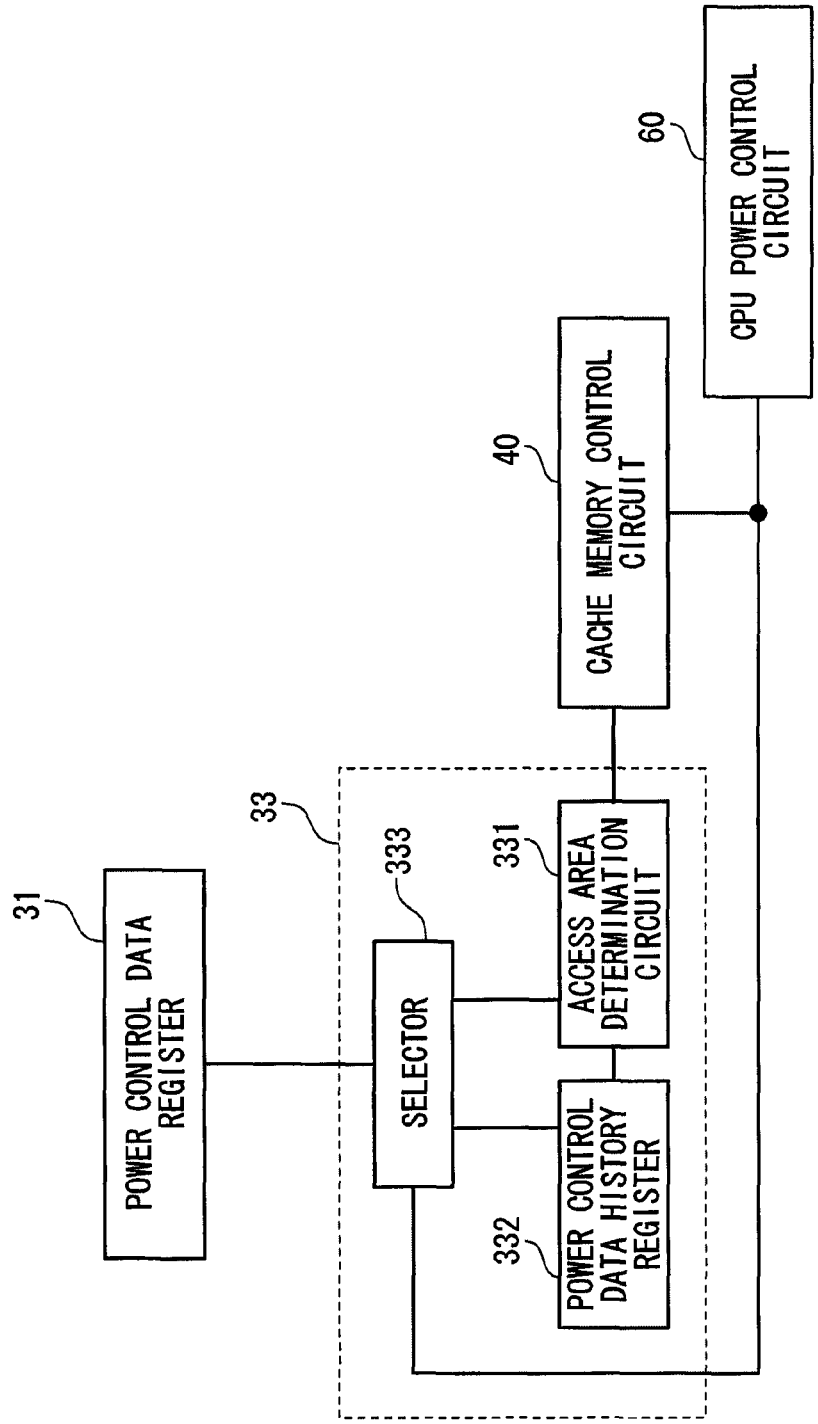
FIG. 4 is a view of a power control data management circuit that is included in the information processing apparatus according to the first exemplary embodiment of the present invention.

FIG. 4 is a block diagram illustrating a configuration of the power control data management circuit 33 for realizing the above-described function. The power control data management circuit 33 according to the present exemplary embodiment includes an access area determination circuit 331, a power control data history register 332, and a selector 333. The access area determination circuit 331 may receive an address when the CPU 50 accesses the cache 10 through the cache memory control circuit 40, and set a data set for controlling each switch 32 of the cache memory power control circuit 30 in the power control data register 31. The power control data history register 332 stores the data set generated in the access area determination circuit 331. The selector 333 selects one of data output from the access area determination circuit 331 and data output from the power control data history register 332, based on a signal output from the CPU power control circuit 60, and stores the selected data in the power control data register 31.

Figure 5:
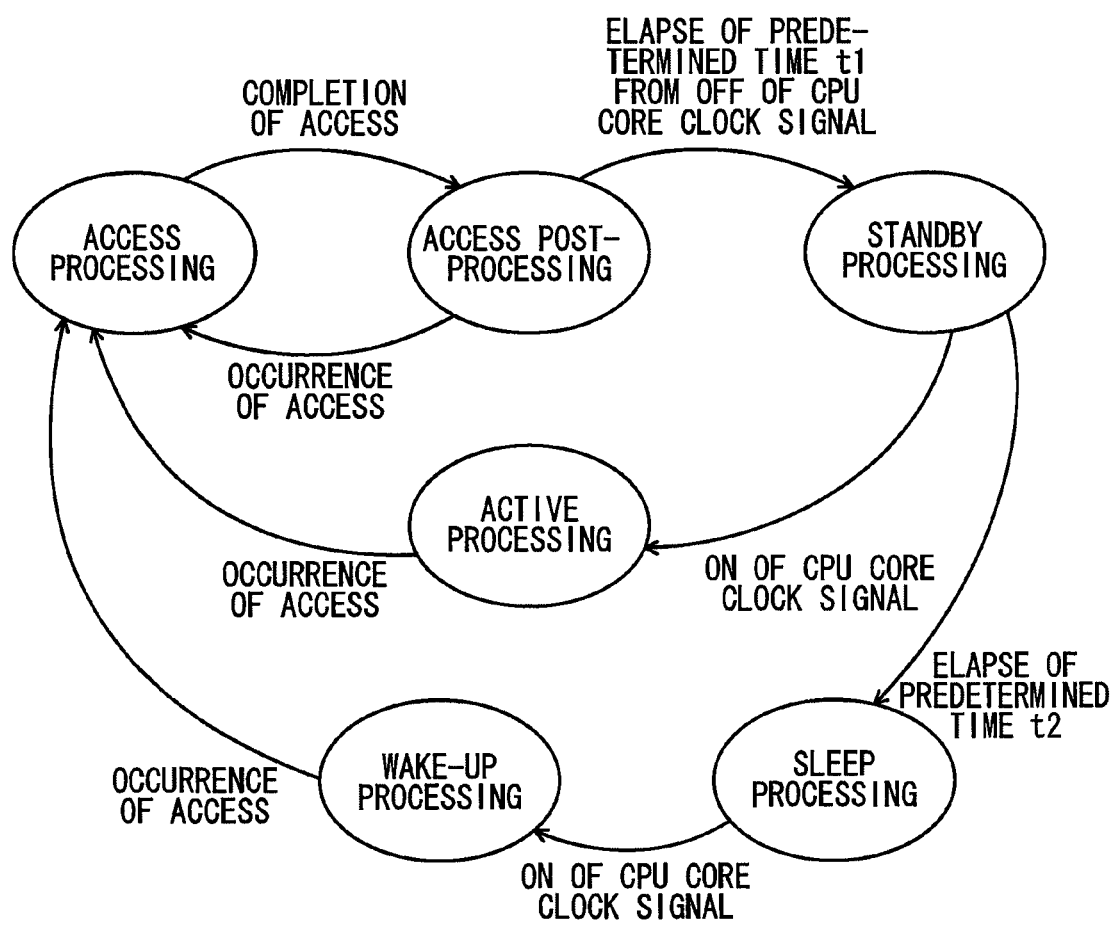
FIG. 5 is a state transition diagram of the information processing apparatus according to the first exemplary embodiment of the present invention.

FIG. 5 is a view illustrating a state transition of the information processing apparatus 1 in a case where the power supply control of the above-described memory block is performed. The state of the information processing apparatus 1 includes an access processing state, an access post-processing state, a standby processing state, an active processing state, a sleep processing state, and a wake-up processing state.

Figure 6:
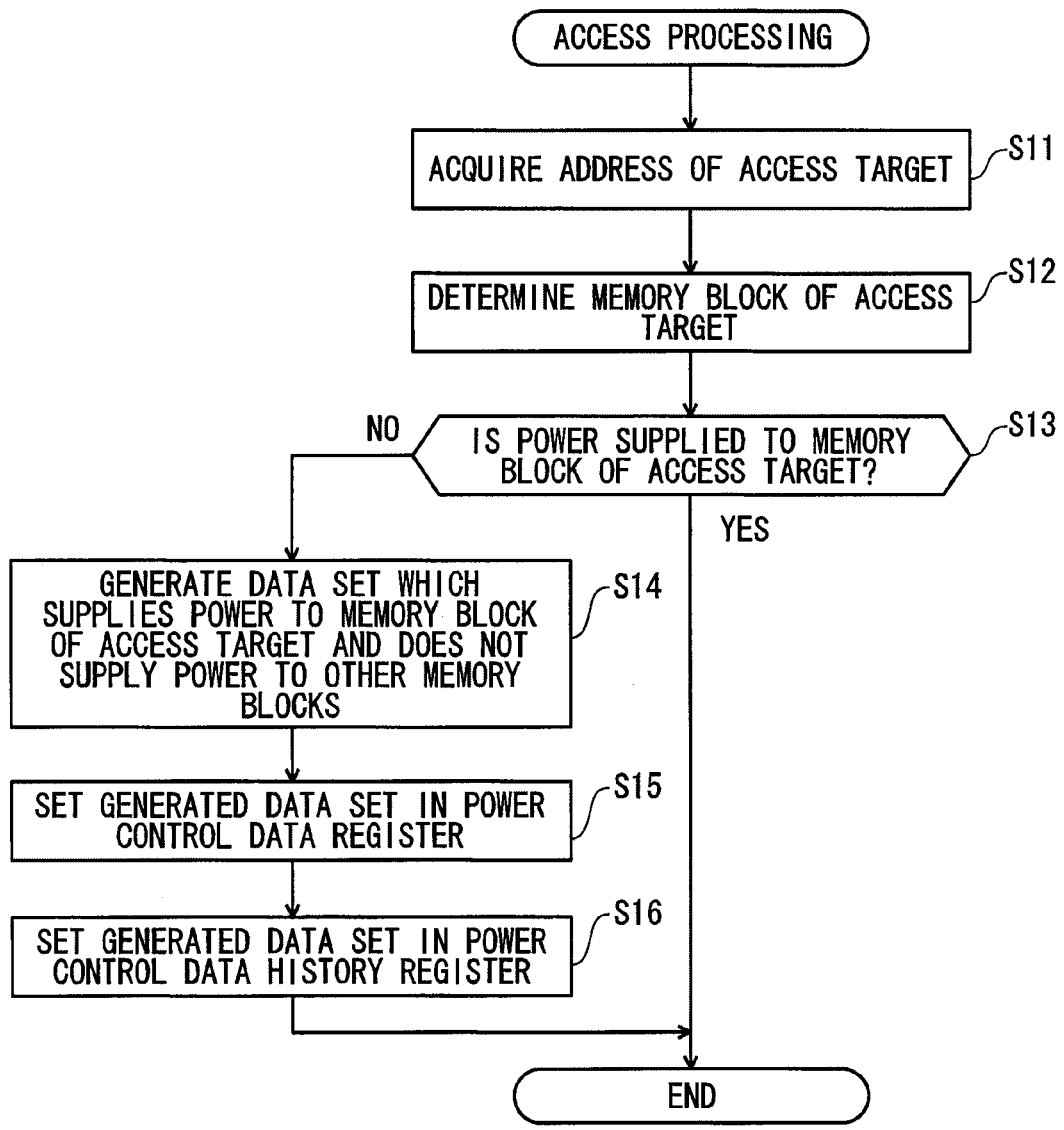
FIG. 6 is a processing flow chart of the power control data management circuit of the information processing apparatus according to the first exemplary embodiment of the present invention.

The access processing state of FIG. 5 is a processing state when a write or read access from the CPU 50 to the cache 10 occurs. An operation of the access area determination circuit 331 in the access processing state is illustrated in FIG. 6.

In the access processing state, the access area determination circuit 331 first acquires the address of the cache to be accessed, which is designated by the CPU 50, from the cache memory control circuit 40 (S11). Then, the access area determination circuit 331 determines the memory block to which the address belongs (referred to as the memory block to be accessed) (S12). If the power is not supplied to the memory block to be accessed ("No" at S13), a data set setting the start of the power supply to the memory block to be accessed and the stop of the power supply to other memory blocks is generated (S14), and the generated data set is set to the power control data register 31 and the power control data history register 332 (S15, S16). Accordingly, the power supply to the memory block to be accessed is started, and the access from the CPU 50 to the memory block 11 is started. That is, a signal is decoded by a decoder driver, and an access to bits to be accessed is performed.

Meanwhile, at step S13, if the power is supplied to the memory block to be accessed ("Yes" at S13), the data set stored in the power control data register 31 is not changed. Therefore, the access from the CPU 50 to the memory block 11 is started immediately.

In the access processing state, if the access to the address to be accessed designated by the CPU 50 is completed, a transition to the access post-processing state is made. In the access post-processing state, the CPU 50 performs the operation processing. If the operation processing performed by the CPU 50 is completed, the CPU power control circuit 60 determines the completion of the operation processing, and outputs a state information signal for switching OFF the CPU core clock signal to the CPU 50, so that the CPU core clock signal is turned to OFF. In the access post-processing state, if a request for access from the CPU 50 to the cache 10 occurs, a transition to the access processing state is made.

Figure 7:
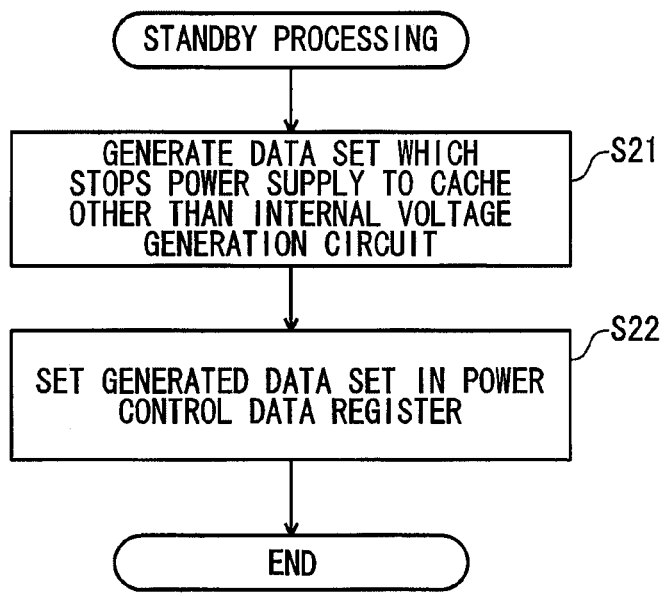
FIG. 7 is a processing flow chart of the power control data management circuit of the information processing apparatus according to the first exemplary embodiment of the present invention.

In the access post-processing state, if it is determined using a timer (not shown) that a predetermined time t1 elapses after the CPU core clock signal is turned to OFF, a transition to the standby processing state is made. In the operation of the access area determination circuit 331 in the standby processing state is illustrated in FIG. 7.

If the predetermined time elapses after the CPU core clock signal is turned to OFF, the access area determination circuit 331 generates a data set to stop the power supply to elements (such as, memory block 11) other than the internal voltage generation circuit 13 and the input/output circuit 12 among the elements of the cache 10 (S21), and sets the generated data set in the power control data register 31 (S22). The switch 32 is switched ON/OFF, based on the data set that is set by the power control data register 31. Accordingly, in the standby processing state, the power is supplied to the internal voltage generation circuit 13 and the input/output circuit 12 within the cache 10, and the power supply to the other circuits is stopped.

Figure 8:
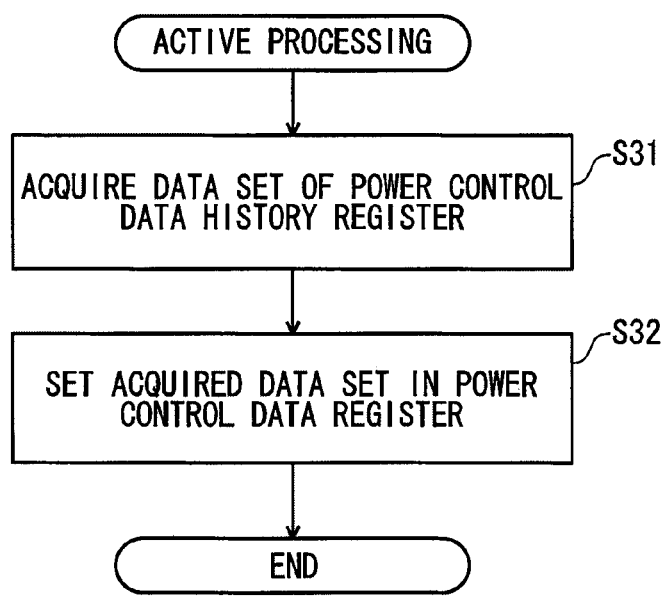
FIG. 8 is a processing flow chart of the power control data management circuit of the information processing apparatus according to the first exemplary of the present invention.

In the standby processing state, if the CPU core clock signal is turned to ON according to the state information signal of the CPU power control circuit 60, a transition to the active processing state is made. The operation of the power control data management circuit 33 in the active processing state is illustrated in FIG. 8.

If the power control data management circuit 33 receives the state signal indicating that the CPU core clock signal is turned to ON, the power control data management circuit 33 acquires the data set stored in the power control data history register 332 by the selector 333 (S31), and sets the acquired data set in the power control data register 31 (S32). The data set stored in the power control data history register 332 is the data set that is set in the access processing state (see S16 of FIG. 7). That is, if the CPU core clock signal changes from OFF to ON, the data set that supplies the power to the memory block accessed lastly may be set in the power control data register 31.

In the active processing state, if the access from the CPU 50 to the cache 10 occurs, a transition to the access processing state is made. In this case, the power control data management circuit 33 performs the power control of the memory block 11, based on the data set which is set in the power control data register in the active processing state, until step S14 of FIG. 6 is completed.

Figure 9:
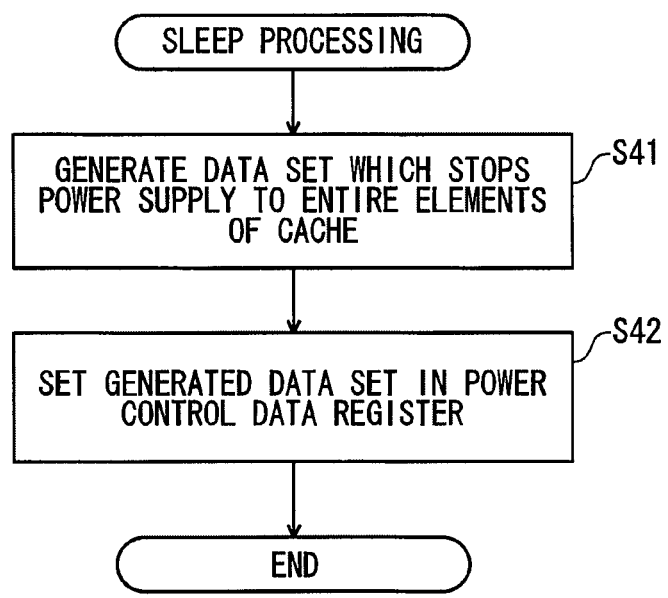
FIG. 9 is a processing flow chart of the power control data management circuit of the information processing apparatus according to the first exemplary embodiment of the present invention.

Meanwhile, in the standby processing state, after a predetermined time t2 elapses, a transition to the sleep processing state is made. That is, if a time (t1+t2) elapses after the CPU core clock signal is turned to OFF, the transition to the sleep processing state is made. The operation of the power control data management circuit 33 in the sleep processing state is illustrated in FIG. 9.

If the time (t1+t2) elapses after the CPU core clock signal is turned to OFF, the power control data management circuit 33 generates a data set that stops the power supply to the entire elements of the cache 10 (S41), and sets the data set in the power control data register 31. Accordingly, while the power is supplied to the input/output circuit 12 and the internal voltage generation circuit 13 in the standby processing state, the power supply to the input/output circuit 12 and the internal voltage generation circuit 13 is also stopped in the sleep processing state.

The internal voltage generation circuit 13 requires a time of about tens to hundreds of microseconds (μs) until the circuit is stabilized after the power is supplied. Hence, if the power of the internal voltage generation circuit 13 is shut down, a processing time until a next access when the next access occurs, is increased. Therefore, as described above, in the standby processing state, the frequent shutdown of the power to the internal voltage generation circuit 13 may be prevented by continuing the power supply to the internal voltage generation circuit 13. If the power is being supplied to the input/output circuit 12, the address intended to be accessed may be latched from the cache memory control circuit 40 to the input/output circuit 12 even when the power supply to the memory block 11 intended to be accessed is not started. Therefore, since the power of the input/output circuit 12 is not shut down, the access to the cache 10 may be performed quickly.

Meanwhile, if the time (t1+t2) elapses after the CPU core clock signal is turned to OFF, it is determined that the access to the cache 10 does not occur for a while. Therefore, power consumption may be further reduced by also stopping the power supply to the input/output circuit 12 and the internal voltage generation circuit 13.

Meanwhile, in the present exemplary embodiment, although it has been described above that the power supply to the input/output circuit 12 and the internal voltage generation circuit 13 is not shut down in the standby processing state, a control may be performed such that the power supply to the memory block 11 and the input/output circuit 12 is shut down, and the power supply to the internal voltage generation circuit 13 is not shut down.

Figure 10:
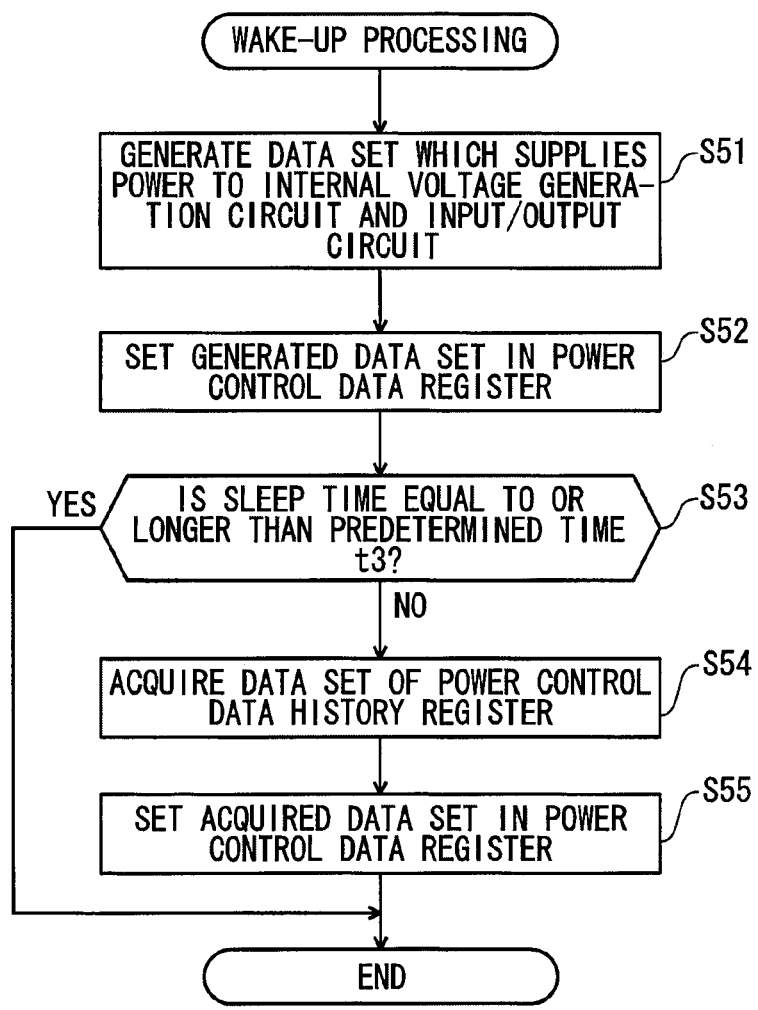
FIG. 10 is a processing flow chart of the power control data management circuit of the information processing apparatus according to the first exemplary embodiment of the present invention.

In the sleep processing state, if the CPU core clock signal is turned to ON, a transition to the wake-up processing state is made according to the state information signal of the CPU power control circuit 60. The operation of the power control data management circuit 33 in the wake-up processing state is illustrated in FIG. 10.

If the CPU core clock signal is turned to ON when the power supply to the entire elements of the cache 10 is stopped, the access area determination circuit 331 first generates a data set that supplies the power to the input/output circuit 12 and the internal voltage generation circuit 13 (S51), and sets the generated data set in the power control data register 32 (S52). As described above, since it takes a time to stabilize the internal voltage generation circuit 13, a time until the access becomes possible is reduced as short as possible by starting the power supply to the internal voltage generation circuit 13 at the beginning.

It is determined whether a sleep time until the CPU core clock signal is turned to ON is equal to or longer than a predetermined time t3. If the sleep time is shorter than t3 ("No" at S53), the data set stored in the power control data history register 32 is acquired (S54), and the acquired data set is set in the power control data register 31 (S55).

If the sleep time until the CPU core clock signal is turned to ON is equal to or longer than t3, it is determined that it is highly likely that the access to memory blocks other than the memory block accessed lastly will occur, for example, as in the case where an application different from a time of the access processing state of the previous time is executed. Therefore, the processing at step S54 and step S55 is not performed.

In the wake-up processing state, if the access from the CPU 50 to the cache 10 occurs, a transition to the access processing state is made.

As described above, the data set, which supplies the power to the memory block accessed lastly and stops the power supply to the other memory blocks, is stored in the power control data history register 332 and, when the CPU core clock signal is turned to OFF and then again turned to ON, the data set stored in the power control data history register 332 is stored in the power control data register 31. In this manner, after the CPU core clock signal is turned to ON, a time (average time) required to start the access from the CPU 50 to the cache 10 may be shortened.

(Second Exemplary Embodiment)

Figure 11:
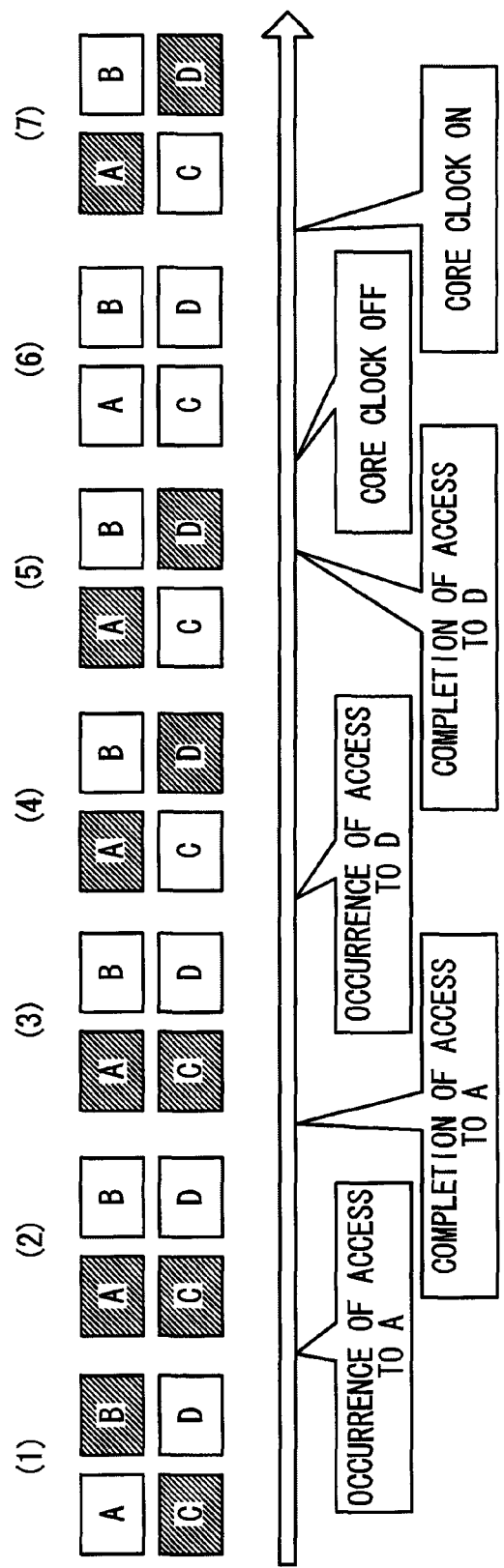
FIG. 11 is a view illustrating a supply control of the power of an information processing apparatus according to a second exemplary embodiment of the present invention.

FIG. 11 is a view illustrating a power supply control of the memory blocks 11 by the information processing apparatus according to the present exemplary embodiment. The information processing apparatus according to the first exemplary embodiment supplies the power to the memory block including the address requested to be accessed from the CPU 50 among the memory blocks included in the cache 10, and shuts down the power to the other memory blocks. In this regards, when the access to the cache 10 is requested from the CPU 50, the information processing apparatus according to the present exemplary embodiment supplies the power to the memory block including the address designated in the access request, and the memory blocks including the address designated in the access requests before 1 to n times. FIG. 11 is a view illustrating a case where n=1, that is, a power supply to the memory block including the address requested to be accessed at the current time from the CPU 50 and the memory block including the address requested to be accessed at the previous time.

For example, in FIG. 11, if the access to the memory block A occurs, the power is supplied to the memory block A and the memory block C to which the access occurred at the previous time, like a state (2). Then, if the access to the memory block D occurs, the power is supplied to the memory block D and the memory block A to which the access occurred at the previous time, like a state (4). As in the state (7), if the CPU core clock signal is turned to ON after the CPU core clock signal is turned to OFF and thus the power of the entire memory blocks is shut down, the power is supplied to the memory blocks (e.g., the memory blocks D and A) to which the power has been supplied before the CPU core clock signal is turned to OFF.

Figure 12:
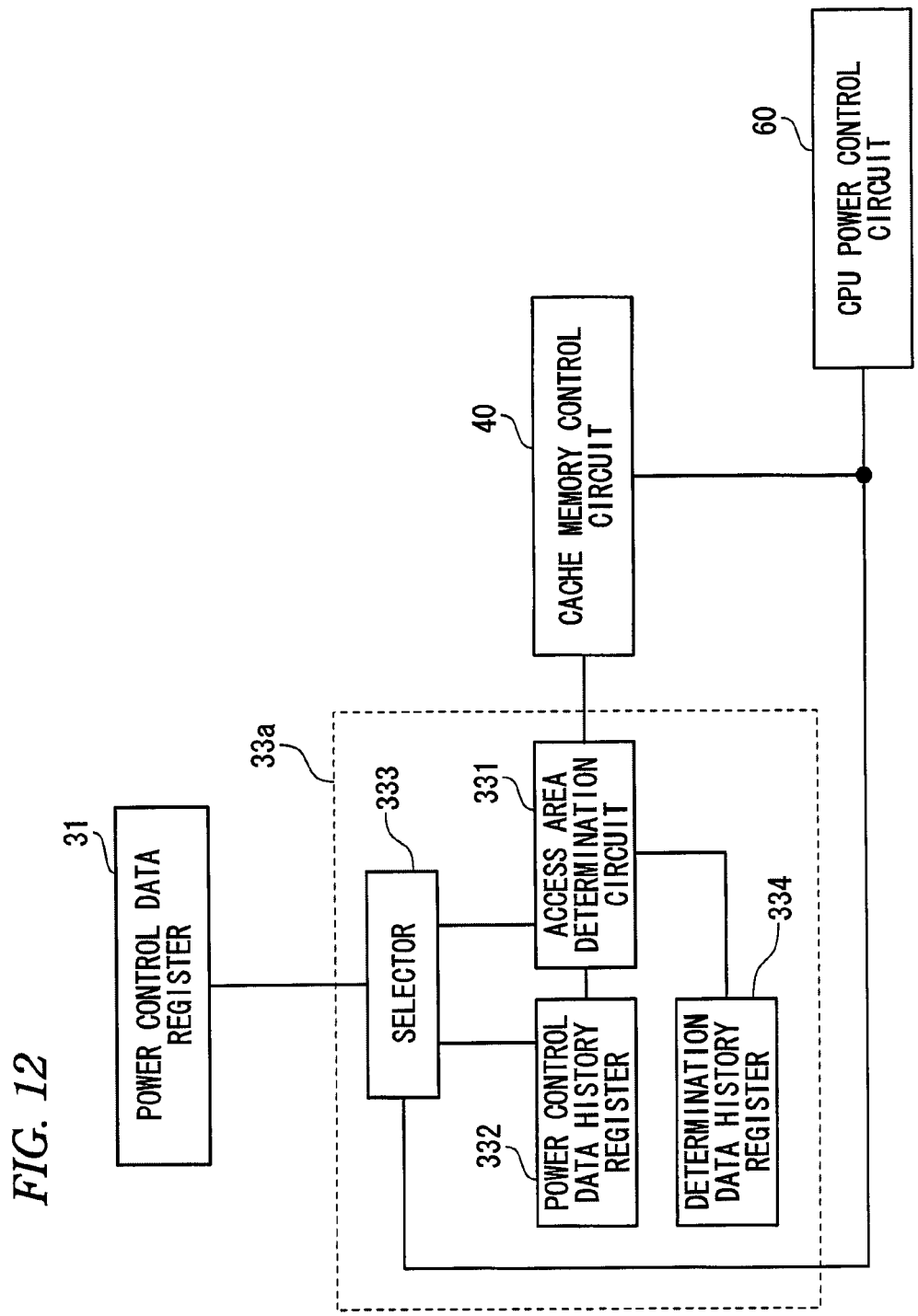
FIG. 12 is a view of a power control data management circuit that is included in the information processing apparatus according to the second exemplary embodiment of the present invention.

In order for the power supply control of the memory blocks as illustrated in FIG. 11, a power control data management circuit is configured as illustrated in FIG. 12. Meanwhile, since blocks other than the power control data management circuit are identical to those of FIG. 1, descriptions thereof will be omitted.

A power control data management circuit 33a of the information processing apparatus according to the second exemplary embodiment includes a determination data history register 334, as well as an access area determination circuit 331, a power control data history register 332, and a selector 333. The determination data history register 334 stores memory blocks accessed before 1 to n times. A format of data stored in the determination data history register 334 is not limited as long as the data in which memory blocks accessed before 1 to n times can be distinguished.

Figure 13:
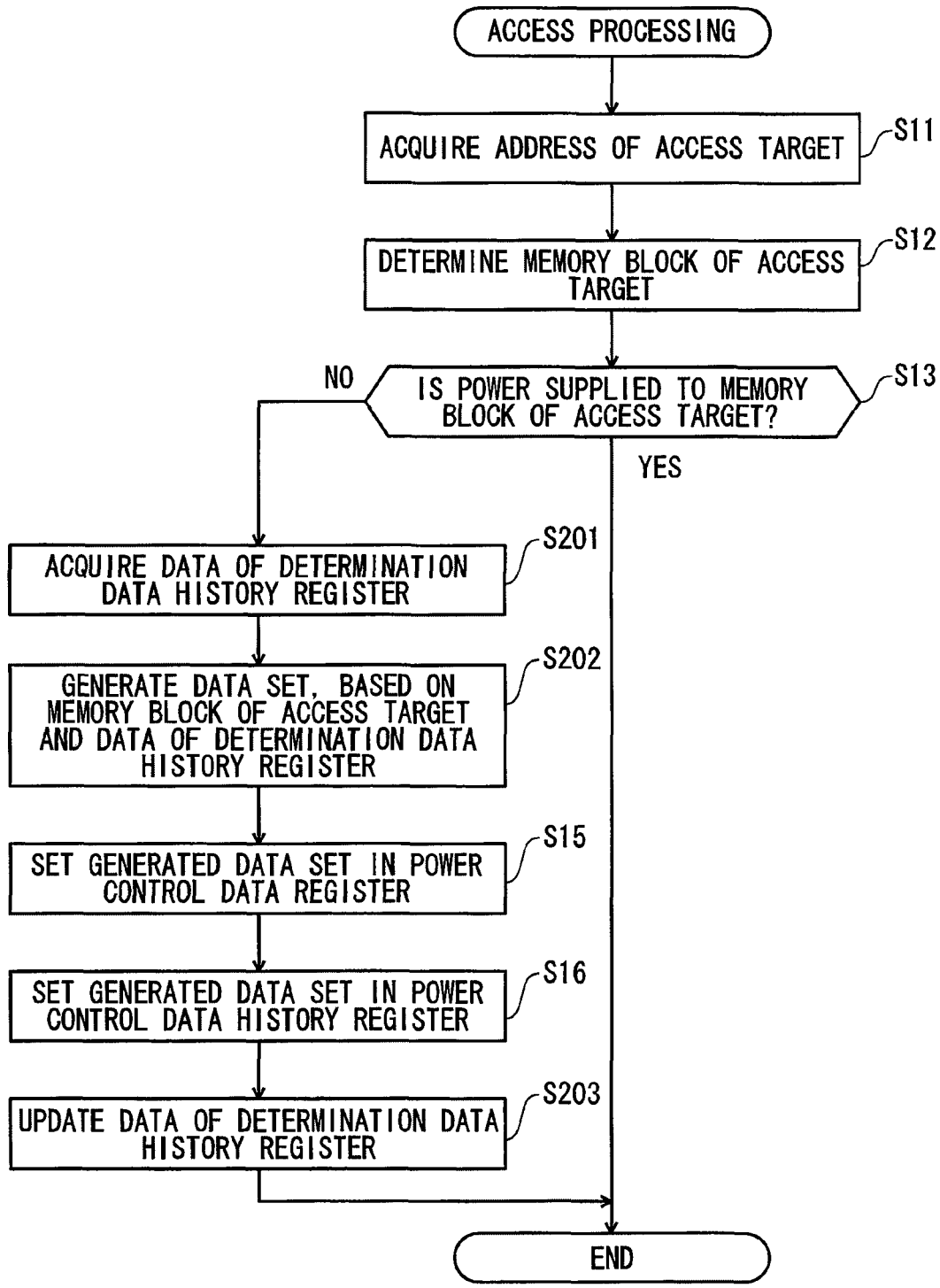
FIG. 13 is a processing flow chart of the power control data management circuit of the information processing apparatus according to the second exemplary embodiment of the present invention.

FIG. 13 is a flow chart illustrating the processing of the power control data management circuit 33a in the access processing state. In FIG. 13, the same symbols are assigned to the same steps as those of FIG. 6, and detailed descriptions thereof will be omitted.

If the access area determination circuit 331 determines the memory block including the address to be accessed and the power of the corresponding memory block is shut down ("No" at S13), the access area determination circuit 331 acquires data stored in the determination data history register (S201). The access area determination circuit 331 generates a data set that supplies the power to the memory block to be accessed and the memory blocks accessed before 1 to n times and shuts down the power of the other memory blocks by using the acquired data of the memory block which is determined at step S12 and the memory blocks accessed before 1 to n times which are acquired at step S201 (S202). The generated data set is set in the power control data register 31 and the power control data history register 332 (S15, S16). The access area determination circuit 331 updates the data of the determination data history register 334 such that the memory block determined at step S12 becomes the memory block accessed before 1 time (S203).

The processing of the standby processing state, the active processing state, the sleep processing state, and the wake-up processing state of the information processing apparatus according to the present exemplary embodiment is identical to the processing described in the first exemplary embodiment. By such a processing, the power supply to the memory blocks may be controlled as illustrated in FIG. 11. According to such a power supply control, the power consumption reduction effect is decreased as compared to the first exemplary embodiment. However, in a case where the access from the CPU 50 occurs, it is highly likely that the power supply to the memory block to be accessed is already done. Therefore, an average processing operation speed becomes fast.

(Third Exemplary Embodiment)

Figure 14:
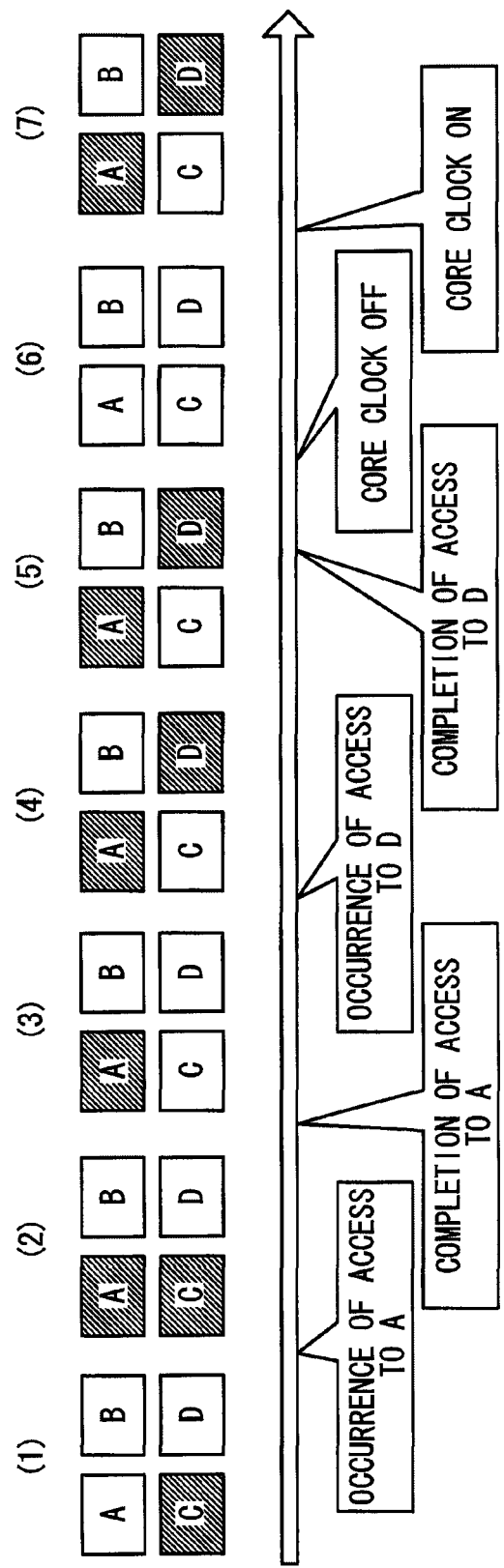
FIG. 14 is a view illustrating a supply control of the power of an information processing apparatus according to a third exemplary embodiment of the present invention.

FIG. 14 is a view illustrating a power supply control of the memory blocks 11 by the information processing apparatus according to the present exemplary embodiment. The information processing apparatus according to the first exemplary embodiment supplies the power to the memory blocks, whose elapsed time from a last accessed time are within a predetermined time, and shuts down the power supply to the other memory blocks.

For example, in FIG. 14, in such a state that the power is supplied to the memory blocks A and C as in the state (2), if a predetermined time elapses from the time accessed lastly to the memory block C, the power supply to the memory block C is shut down and the power supply to the memory block A is continued, as in the state (3).

Figure 15:
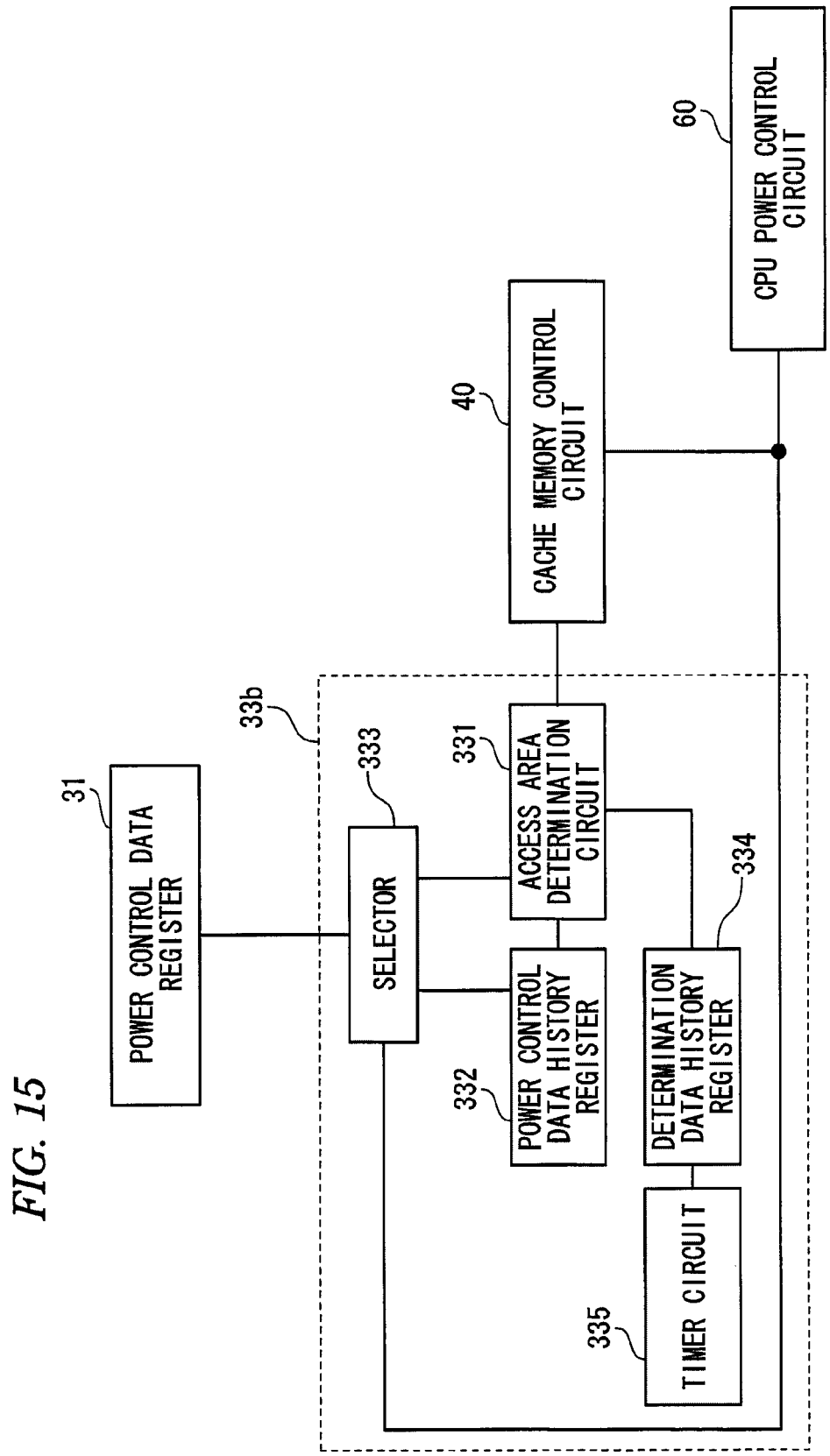
FIG. 15 is a view of a power control data management circuit that is included in the information processing apparatus according to the third exemplary embodiment of the present invention.

In order for the power supply control of the memory blocks illustrated in FIG. 14, a power control data management circuit is configured as illustrated in FIG. 15. Meanwhile, since blocks other than the power control data management circuit are identical to those of FIG. 1, descriptions thereof will be omitted.

The power control data management circuit 33b according to the present exemplary embodiment includes a timer circuit 335 as well as the elements described in the power control data management circuit 33a described in the second exemplary embodiment. The determination data history register 334 of the power control data management circuit 33b includes, for example, 1-bit flag corresponding to each memory block included in the cache 10. Initial values of the flags of the determination data history register 334 are set to "0".

Figure 16:
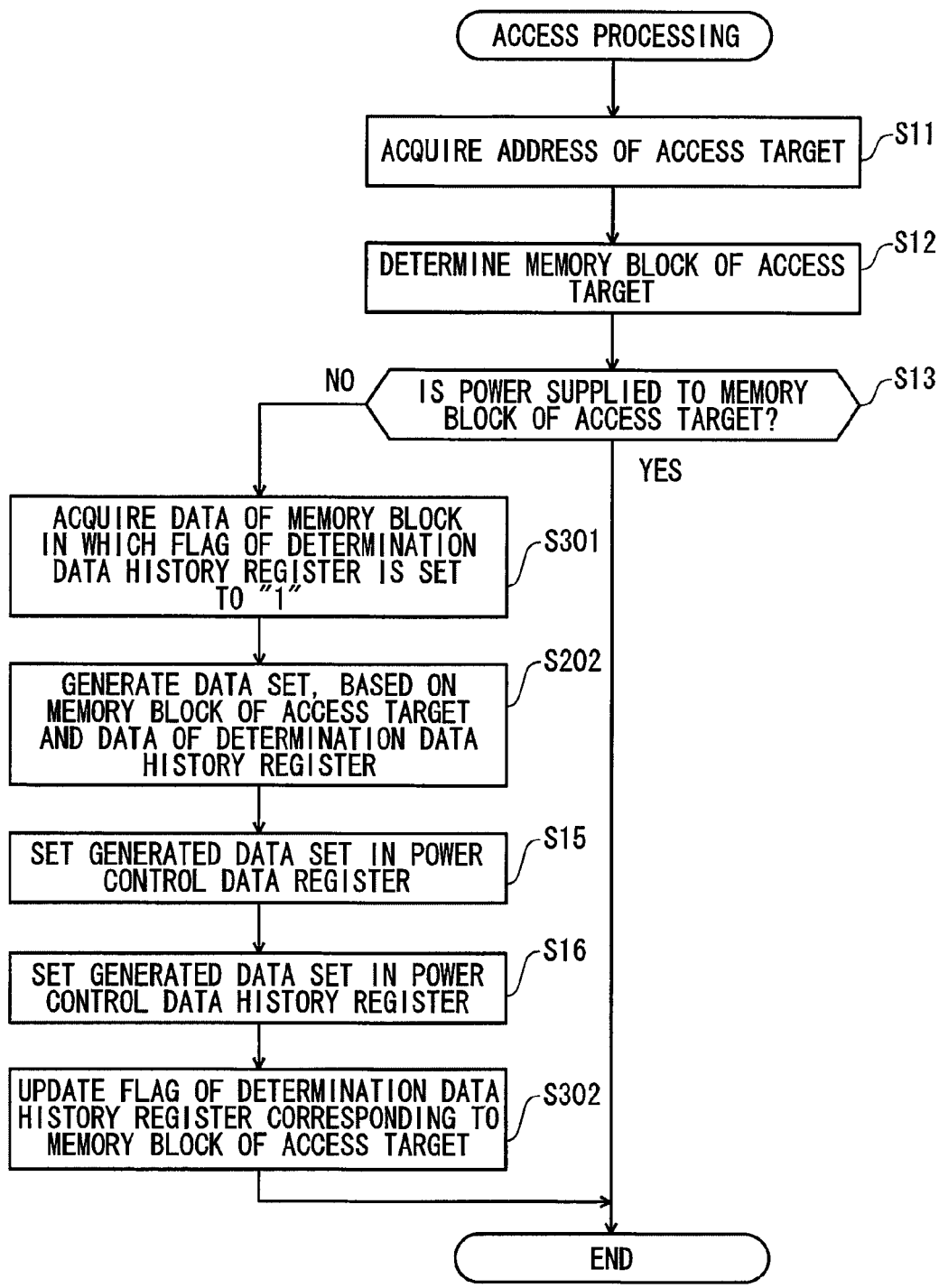
FIG. 16 is a processing flow chart of the power control data management circuit of the information processing apparatus according to the third exemplary embodiment of the present invention.

FIG. 16 is a flow chart illustrating the processing of the power control data management circuit 33b. In FIG. 16, the same symbols are assigned to the same steps as those of FIG. 13, and detailed descriptions will be omitted.

The access area determination circuit 331 determines the memory block to be accessed, and acquires data representing the memory block to be accessed and the memory block in which the flag is set to "1" in the determination data history register 334 (S301). A data set is generated, which supplies the power to the memory block to be accessed and the memory block in which the flag is set to "1" in the determination data history register 334, and shuts down the power supply to the other memory blocks (S202). The generated data set is set in the power control data register 31 and the power control data history register 332. The flag of the determination data history register 334 corresponding to the memory block determined at step S12 is changed to "1" (S302).

The timer circuit 335 changes the flag to "0" if a predetermined time elapses from a time at which each flag of the determination data history register 334 is changed to "1".

By such a processing, the elapsed time after the last access to each memory block is managed, and the power may be supplied to the memory block whose elapsed time after the last access is short.

(Fourth Exemplary Embodiment)

Figure 17:
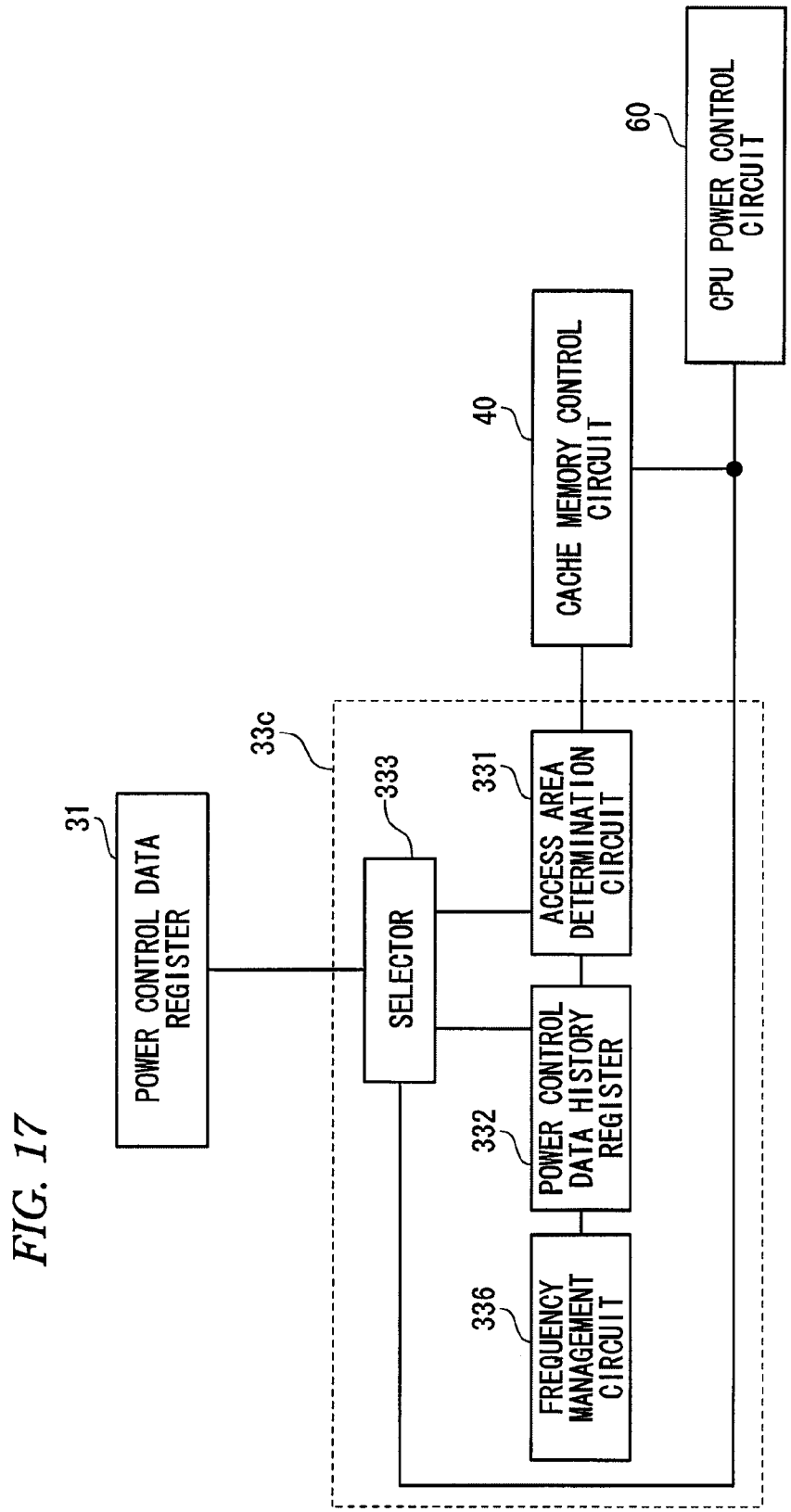
FIG. 17 is a view of a power control data management circuit that is included in an information processing apparatus according to a fourth exemplary embodiment of the present invention.

The memory block, to which the power is supplied when the CPU core clock signal is switched from OFF to ON, may be a memory block having high access frequency. FIG. 17 is a block diagram illustrating a configuration of a power control data management circuit 33c of the information processing apparatus according to the present exemplary embodiment. Blocks other than the power control data management circuit 33c are identical to those of FIG. 1.

The power control data management circuit 33c includes an access area determination circuit 331, a power control data history register 332, a selector 333, and a frequency management circuit 336. The power control data history register 332 of the power control data management circuit 33c includes, for example, 1-bit flags corresponding to the respective elements included in the cache 10 (the memory blocks 11, the input/output circuit 12, and the internal voltage generation circuit 13). Initial values of the flags of the power control data history register 332 are set to "0".

The frequency management circuit 336 updates data representing the access frequency of the memory block, whenever the memory block intended to be accessed is determined by the access area determination circuit 331. The access frequency may be the number of times of access to each memory block within a predetermined time, or may be the number of times of access to each memory block during a predetermined number of times of access.

As such, the flag of the power control data history register 332 corresponding to the memory block determined as having high access frequency by the frequency management circuit 336 is set to "1". Therefore, in a case where the CPU core clock signal is switched from OFF to ON, the power supply to the memory block having high access frequency may be performed rapidly, based on the data of the power control data history register 332.

(Fifth Exemplary Embodiment)

Figure 18:
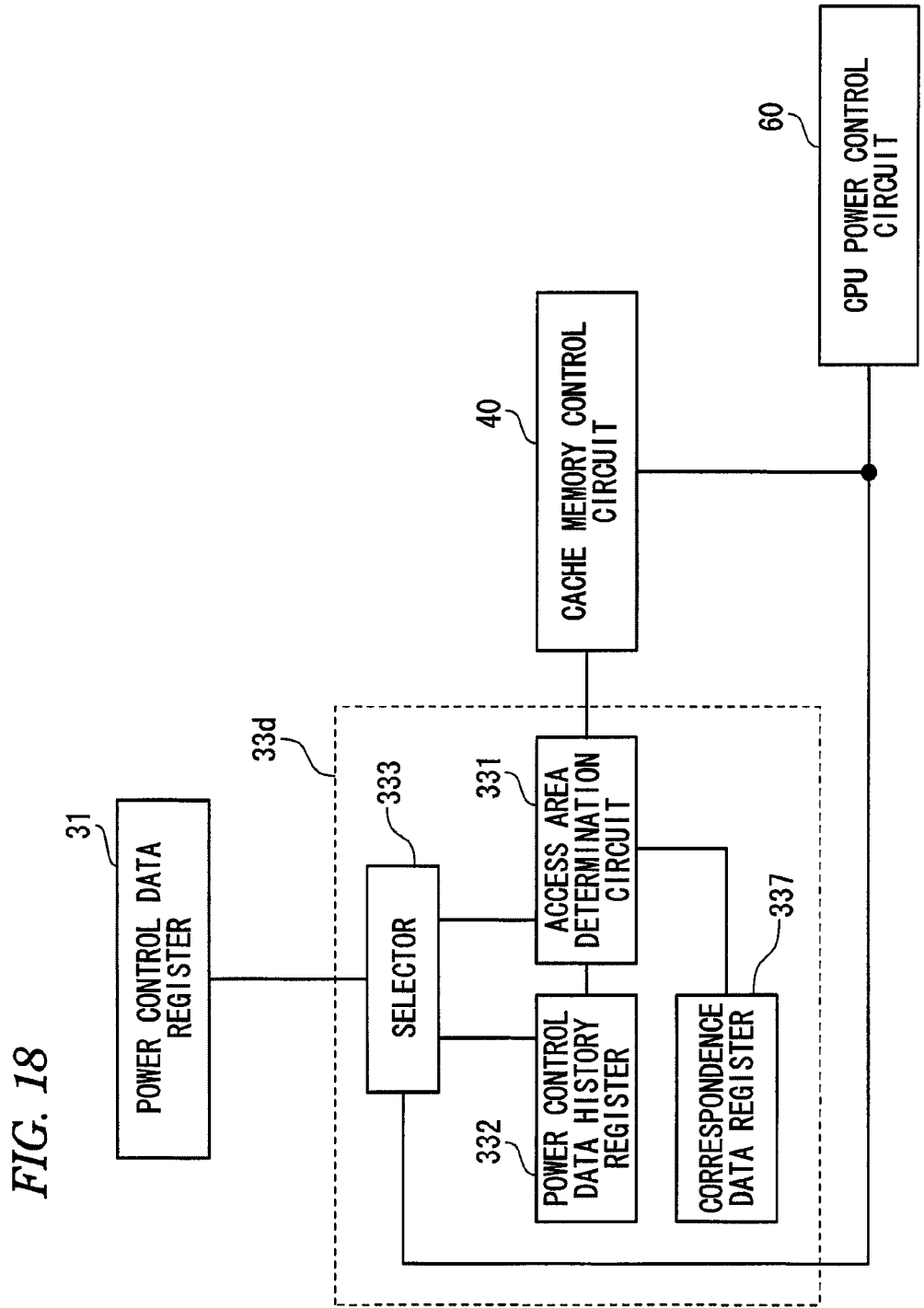
FIG. 18 is a view of a power control data management circuit that is included in an information processing apparatus according to a fifth exemplary embodiment of the present invention.

When data is written in the cache 10, data necessary in a predetermined application may be written in the same memory block 11. As illustrated in FIG. 18, a correspondence data register 337 is installed to store data representing a correspondence relationship between the application and the memory block in which the data is written. Therefore, when an access request from the CPU 50 occurs, the power may be supplied to the memory block 11 according to the application that is being executed in the CPU 50.

Through the configurations of these exemplary embodiments, the information processing apparatus capable of achieving a low-power-consumption memory and a high-speed access may be provided.

Meanwhile, the present invention is not limited to the above-described exemplary embodiments, but may be appropriately modified without departing from the spirit and scope of the present invention. For example, although it has been described in the above-described exemplary embodiments that the power control of the memory blocks and the voltage generation circuit of the cache within the CPU is performed, the information processing apparatus may be configured with the CPU and the main memory made of a nonvolatile memory, and the power control of the memory blocks and the voltage generation circuit of the main memory, which is installed outside the CPU, may be performed. Even the power control of the main memory may be realized by the same processing as the power control of the cache. For example, two or more of the first to fifth exemplary embodiments may be combined.

What is claimed is:

1. An information processing apparatus, comprising:
a processor configured to be operated according to a clock signal;
a plurality of memory blocks including at least a nonvolatile memory;
an internal voltage generator connected to the plurality of memory blocks;
an input/output circuit connected to the plurality of memory blocks;
a plurality of switches each installed corresponding to the internal voltage generator, the input/output circuit, and the plurality of memory blocks, and configured to switch ON/OFF of the connection with a power source;
a power control data register configured to store a data set that controls the ON/OFF of the switches;
a power control data management circuit configured to set the data set in the power control data register, and
a power control data history register configured to store a second data set, which is set by the power control data register when an access to any of the memory blocks is requested lastly from the processor,
wherein when the clock signal input to the processor is turned to OFF, the power control data management circuit generates a first type of the data set, which switches ON the switch connected to the internal voltage generator and switches OFF the switches connected to the plurality of memory blocks, and sets the first type of the data set in the power control data register, and
wherein the power control data management circuit sets the first type of the data set in the power control data register, based on the state in which the clock signal input to the processor core is turned to OFF, and sets the second data set, which is stored in the power control data history register, in the power control data register when the clock signal input to the processor is turned to ON.

2. The information processing apparatus of claim 1, wherein when the power control data management circuit acquires an access target address from the processor, the second data set is a data set which switches ON the switch connected to the memory block including a memory of the address to be accessed among the plurality of memory blocks, and switches OFF the switches connected to at least one different memory blocks, and the second data set is set in the power control data register and the power control data history register.

3. An information processor apparatus, comprising:
a processor configured to be operated according to a clock signal;
a plurality of memory blocks including at least a nonvolatile memory;
an internal voltage generator connected to the plurality of memory blocks;
an input/output circuit connected to the plurality of memory blocks;
a plurality of switches each installed corresponding to the internal voltage generator, the input/output circuit, and the plurality of memory blocks, and configured to switch ON/OFF of the connection with a power source;
a power control data register configured to store a data set that controls the ON/OFF of the switches; and a power control data management circuit configured to set the data set in the power control data register, wherein when the clock signal input to the processor is turned to OFF, the power control data management circuit generates a first type of the data set, which switches ON the switch connected to the internal voltage generator and switches OFF the switches connected to the plurality of memory blocks, and sets the first type of the data set in the power control data register, and wherein when a predetermined time elapses after the clock signal input to the processor is turned to OFF, the power control data management circuit generates a second data set which switches OFF the switch connected to the internal voltage generator and the switches connected to the plurality of memory blocks, and sets the third data set in the power control data register.

4. The information processing apparatus of claim 3, wherein when a predetermined time elapses after the clock signal input to the processor is turned to OFF, the power control data management circuit sets the second data set, which switches OFF the switch connected to the internal voltage generator and the switches connected to the plurality of memory blocks, in the power control data register, and when the clock signal input to the processor is turned to ON, the power control data management circuit generates a third data set which switches ON the switch connected to the internal voltage generator, and sets the third data set in the power control data register.

5. The information processing apparatus of claim 1, wherein when the power control data management circuit acquires the address to be accessed from the processor, the second data set in a data set which switches ON the switch connected to the memory block including the memory of the address to be accessed among the plurality of memory blocks, and the switch connected to the memory block accessed at a previous time, and switches OFF the switches connected to the other memory blocks, and the second data set is set in the power control data register and the power control data history register.

6. The information processing apparatus of claim 1, wherein when the power control data management circuit acquires the address to be accessed from the processor, the second data set in a data set which switches ON the switch connected to the memory block including the memory of the address to be accessed, and the switch connected to the memory block before a predetermined time elapses, among the plurality of memory blocks, and switches OFF the switches connected to the other memory blocks, and the second data set is set in the power control data register and the power control data history register.

7. An information processing apparatus, comprising:

a processor configured to be operated according to a clock signal;

a plurality of memory blocks including at least a nonvolatile memory;

an internal voltage generator connected to the plurality of memory blocks;

an input/output circuit connected to the plurality of memory blocks;

a plurality of switches each installed corresponding to the internal voltage generator, the input/output circuit, and the plurality of memory blocks, and configured to switch ON/OFF of the connection with a power source;

a power control data register configured to store a data set that controls the ON/OFF of the switches;

a power control data management circuit configured to set the data set in the power control data register; and a power control data history register that stores a second data set which switches ON the switch connected to a memory block whose frequency of access from the processor is high, and switches OFF the switch connected to at least one different memory block, wherein when the clock signal input to the processor is turned to OFF, the power control data management circuit generates a first type of the data set, which switches ON the switch connected to the internal voltage generator and switches OFF the switches connected to the plurality of memory block, and sets the first type of the data set in the power control data register, and wherein the power control data management circuit sets the first type of the data set in the power control data register, based on the state in which the clock signal input to the processor core is turned to OFF, and sets the second data set, which is stored in the power control data history register, in the power control data register when the clock signal input to the processor is turned to ON.

8. An information processing apparatus, comprising:

processor configured to be operated according to a clock signal;

a plurality of memory blocks including at least a nonvolatile memory;

an internal voltage generator connected to the plurality of memo blocks;

an input/output circuit connected to the plurality of memory blocks;

a plurality of switches each installed corresponding to the internal voltage generator, the input/output circuit, and the plurality of memory blocks, and configured to switch ON/OFF of the connection with a power source;

a power control data register configured to store a data set that controls the ON/OFF of the switches; and a power control data management circuit configured to set the data set in the power control data register, wherein when the clock signal input to the processor is turned to OFF, the power control data management circuit generates a first type of the data set, which switches ON the switch connected to the internal voltage generator and switches OFF the switches connected to the plurality of memory blocks, and sets the first type of the data set in the power control data register, and wherein the first type of the data set switches ON the switch connected to the internal voltage generator, switches OFF the switches connected to the plurality of memory blocks, and simultaneously, switches ON the switch connected to the input/output circuit.

9. The information processing apparatus of claim 1, wherein the power control data management circuit generates a third data set to shut down the power supply to a memory block and set in the power control data register when the memory block being not accessed for more than a predetermined time.

10. The information processing apparatus of claim 1, wherein the memory blocks are cache memories provided in a CPU.

11. The information processing apparatus of claim 3, wherein the power control data management circuit generates a third data set to shut down the power supply to a memory block and set in the power control data register when the memory block being not accessed for more than a predetermined time.

12. The information processing apparatus of claim 7, wherein the power control data management circuit generates a third data set to shut down the power supply to a memory block and set in the power control data register when the memory block being not accessed for more than a predetermined time.

13. The information processing apparatus of claim 8, wherein the power control data management circuit generates a second data set to shut down the power supply to a memory block and set in the power control data register when the memory block being not accessed for more than a predetermined time.

14. The information processing apparatus of claim 3, wherein the memory blocks are cache memories provided in a CPU.

15. The information processing apparatus of claim 7, wherein the memory blocks are cache memories provided in a CPU.

16. The information processing apparatus of claim 8, wherein the memory blocks are cache memories provided in a CPU.

* * * * *